(12) United States Patent
Shin et al.

(10) Patent No.: US 11,316,555 B2
(45) Date of Patent: Apr. 26, 2022

(54) WIRELESS SIGNAL RECEPTION DEVICE AND METHOD FOR MINIMIZING ELECTROMAGNETIC WAVE THAT IS GENERATED WHEN TRANSMITTING THE RECEIVED SIGNAL

(71) Applicant: SAMSUNG ELECTRONICS CO., LTD., Suwon-si (KR)

(72) Inventors: Hyunjong Shin, Suwon-si (KR); Junseok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/771,077

(22) PCT Filed: Jan. 9, 2019

(86) PCT No.: PCT/KR2019/000349
§ 371 (c)(1),
(2) Date: Jun. 9, 2020

(87) PCT Pub. No.: WO2019/143063
PCT Pub. Date: Jul. 25, 2019

(65) Prior Publication Data
US 2021/0194534 A1 Jun. 24, 2021

(30) Foreign Application Priority Data
Jan. 18, 2018 (KR) .......................... 10-2018-0006760

(51) Int. Cl.
*H04B 1/71* (2011.01)
*H04B 1/707* (2011.01)

(52) U.S. Cl.
CPC ....... *H04B 1/7102* (2013.01); *H04B 1/70718* (2013.01)

(58) Field of Classification Search
CPC .. H04B 7/0413; H04B 7/0456; H04B 7/0617; H04B 1/16; H04B 1/28; H04B 1/0064;
(Continued)

(56) References Cited

U.S. PATENT DOCUMENTS 5,463,656 A * 10/1995 Polivka .................. H01Q 1/286
348/E7.093
6,442,193 B1 8/2002 Hirsch
(Continued)

FOREIGN PATENT DOCUMENTS

KR 10-2002-0033831 A 5/2002
KR 10-0705064 B1 4/2007
(Continued)

OTHER PUBLICATIONS

International Search Report (PCT/ISA/210) dated Apr. 5, 2019 by the International Searching Authority in counterpart International Patent Application No. PCT/KR2019/000349.
(Continued)

*Primary Examiner* — Golam Sorowar
(74) *Attorney, Agent, or Firm* — Sughrue Mion, PLLC

(57) ABSTRACT

A wireless signal receiving device is disclosed that includes an RF tuner for receiving a wireless signal over an antenna radiator, a demodulator for demodulating the received signal to output a signal of a first frequency band, and a spread spectrum modulator for spreading a frequency spectrum of the demodulated signal to output a signal of a second frequency band. In addition, various embodiments recognized through the specification are possible.

10 Claims, 6 Drawing Sheets

(58) Field of Classification Search
CPC ...... H04B 1/0096; H04B 1/0475; H04B 1/38;
H04B 7/0404; H04B 7/14; H04B 1/1036;
H04B 1/40; H04B 7/0697; H04B 7/0874;
H04B 7/10; H04B 1/0017; H04B 1/04;
H04B 1/10; H04B 1/707; H04N 21/4263;
H04N 21/4382; H04N 21/43637; H04N
21/6112; H04N 21/6143; H04N 5/50;
H04N 21/2365; H04N 21/42204; H04N
21/42615; H04N 21/43635; H04N 5/455;
H04N 21/4122; H04N 21/41407; H04N
21/43632; H04N 21/440218; H04N 5/44;
H04N 5/4403; H04N 5/46; H04N
21/2393; H04L 27/0002; H04L 27/00;
H04L 27/32; H04L 5/1461; H04L
27/0008; H04L 27/26; H04L 27/2613;
H04L 27/2666; H04L 27/36; H04L
5/0048; H04L 1/0083; H04L 27/04; H04L
27/10; H04L 27/2602; H04L 27/2636;
H04L 5/0044; H04L 5/06; H04L
2027/0051; H04L 25/02; H04W 84/20;
H04W 16/26; H04W 16/28; H04W 4/06;
H04W 4/10; H04W 4/18; H04W 4/90;
H04W 72/04; H04W 72/0426; H04W
76/40; H04W 76/45; H04W 76/50; H04W
80/10; H04W 28/10; H04W 40/12; H04W
56/0015; H04W 76/14; H04W 52/0229;
H04W 52/02; H04W 52/0209
See application file for complete search history.

(56) References Cited

U.S. PATENT DOCUMENTS

| | | | |
|---|---|---|---|
| 6,665,019 B1 | 12/2003 | Pronkine | |
| 8,588,345 B1* | 11/2013 | Jeong | H04L 27/2663 375/340 |
| 8,619,749 B2 | 12/2013 | Troemel, Jr. | |
| 8,761,227 B2 | 6/2014 | Lee et al. | |
| 8,933,917 B2 | 1/2015 | Kim et al. | |
| 2004/0174812 A1* | 9/2004 | Murakami | H04B 1/7075 370/215 |
| 2013/0182747 A1* | 7/2013 | Nakamura | H04B 1/7073 375/145 |
| 2014/0044026 A1 | 2/2014 | Troemel, Jr. | |

FOREIGN PATENT DOCUMENTS

| | | | | |
|---|---|---|---|---|
| KR | 10-2009-0076603 A | | 7/2009 | |
| KR | 10-1030539 B1 | | 4/2011 | |
| KR | 101030539 B1 | * | 4/2011 | |
| KR | 10-1090341 B1 | | 12/2011 | |
| KR | 10-2012-0078957 A | | 7/2012 | |
| KR | 20120078957 A | * | 7/2012 | ........... G09G 3/2096 |
| KR | 10-1268022 B1 | | 5/2013 | |
| KR | 10-1648510 B1 | | 8/2016 | |
| KR | 10-1721261 B1 | | 3/2017 | |

OTHER PUBLICATIONS

Written Opinion (PCT/ISA/237) dated Apr. 5, 2019 by the International Searching Authority in counterpart International Patent Application No. PCT/KR2019/000349.

Communication dated Nov. 26, 2020 issued by the European Patent Office in application No. 19741249.7.

Technisat: "Montageanleitung TechniLAN WM500 WiFi Modem", May 1, 2015, XP055750798, pp. 1-4, Cited in EP comm. dated Nov. 26, 2020 in appl'n. No. 19741249.7.

* cited by examiner

WIRELESS SIGNAL RECEPTION DEVICE AND METHOD FOR MINIMIZING ELECTROMAGNETIC WAVE THAT IS GENERATED WHEN TRANSMITTING THE RECEIVED SIGNAL

TECHNICAL FIELD

Embodiments disclosed in the disclosure relate to technologies of transmitting or receiving wireless signals.

BACKGROUND ART

A display device may receive various contents in several manners from an external device and may output the received content via a display, a speaker, or the like. The display device may receive content via a cable directly connected from a broadcasting station or may receive content through an RF signal. Furthermore, the display device may receive content through a wireless signal of satellite communication.

Because the wireless signal including the content is radiated into the air to be transmitted to the display device, a variety of processing for minimizing loss may be performed. The display device may transmit the received signal to several configurations for performing an operation of the display device to output the content included in the wireless signal. Particularly, the display device may transmit the processed signal to several configurations along a conductive line formed on a printed circuit board (PCB). Thus, the display device may output content included in a signal processed in a form capable of being output, through the display, the speaker, and the like.

DISCLOSURE

Technical Problem

In a wireless signal receiving device, a display or the like for outputting content included in the received signal may increase in size, whereas a space (e.g., a PCB) where a configuration for processing data will be disposed may decrease. The wireless signal receiving device may quickly process a large amount of data in a space in a limited PCB using a clock (CLK) of a short period and a signal of a high level and may quickly transmit the processed data through a limited data line. Thus, the wireless signal receiving device may generate electro magnetic Interference (EMI) by noise of a high frequency signal when transmitting the processed data.

Various embodiments of the disclosure may receive a signal including content including a large amount of data and may minimize that an electromagnetic wave is generated when transmitting the received signal to a configuration specified for processing.

Technical Solution

In accordance with an aspect of the disclosure, a wireless signal receiving device is provided. The apparatus may include an RF tuner configured to receive a wireless signal over an antenna radiator, a demodulator configured to demodulate the received signal to output a signal of a first frequency band, and a spread spectrum modulator configured to spread a frequency spectrum of the demodulated signal to output a signal of a second frequency band.

In accordance with another aspect of the disclosure, a method for processing a received signal in a wireless signal receiving device is provided. The method may include receiving a wireless signal over an antenna radiator, demodulating the received signal to output a signal of a first frequency band, and spreading a frequency spectrum of the demodulated signal to output a signal of a second frequency band.

In accordance with another aspect of the disclosure, a storage medium is provided. The storage medium may store a program for performing a method including receiving a wireless signal over an antenna radiator, demodulating the received signal to output a signal of a first frequency band, and spreading a frequency spectrum of the demodulated signal to output a signal of a second frequency band.

Advantageous Effects

According to various embodiments disclosed in the disclosure, when transmitting a data signal included in a transport stream (TS) signal in series to process a signal including content such as a high-quality image, the wireless signal receiving device may spread a frequency spectrum of the TS signal according to a radio frequency (RF) signal of a high current (or voltage) using a spread spectrum used in a place for spreading a band of a low voltage differential signaling (LVDS) signal, thus preventing an electromagnetic wave of a specified level or more capable of interfering with an operation of an external electronic device from being generated.

In addition, various effects ascertained directly or indirectly through the disclosure may be provided.

DESCRIPTION OF DRAWINGS

Referring to FIG. 1, a wireless communication system 1 may include a wireless signal receiving device 10 and a wireless signal transmitting device 20. The wireless signal receiving device 10 may receive a wireless signal from the wireless signal transmitting device 20 over a wireless network and may output content included in the received signal.

Figure 1:
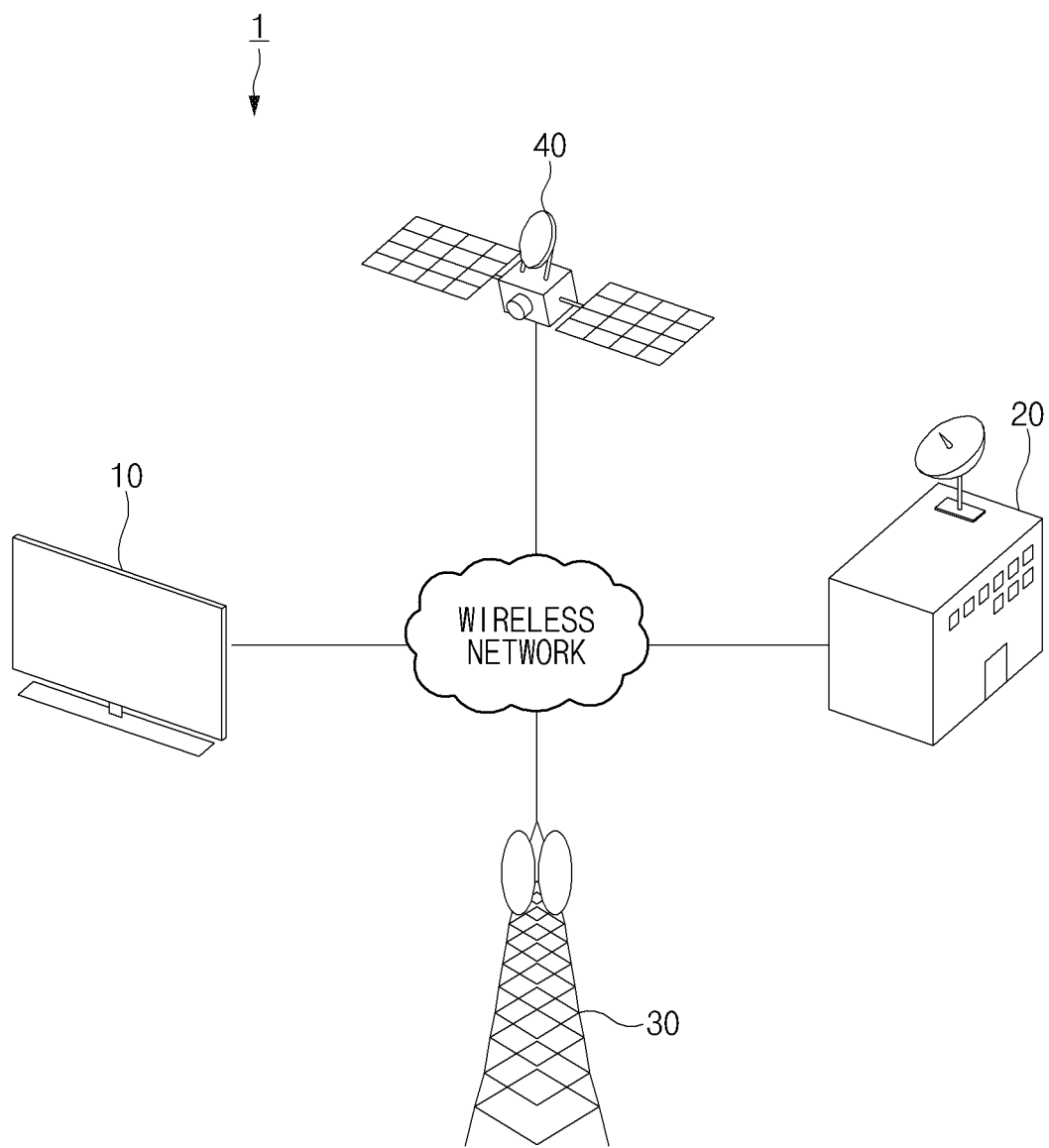
FIG. 1 is a drawing illustrating a wireless communication system according to various embodiments of the disclosure.

With regard to description of drawings, the same or similar denotations may be used for the same or similar components.

MODE FOR INVENTION

Hereinafter, various embodiments of the disclosure may be described with reference to accompanying drawings.

However, it should be understood that this is not intended to limit the disclosure to specific implementation forms and includes various modifications, equivalents, and/or alternatives of embodiments of the disclosure. With regard to description of drawings, similar denotations may be used for similar components.

According to an embodiment, the wireless signal receiving device 10 may receive a wireless signal. For example, the wireless signal receiving device 10 may receive the wireless signal from the wireless signal transmitting device 20. According to an embodiment, the wireless signal receiving device 10 may process the received signal. For example, the wireless signal receiving device 10 may output content included in the received signal. According to an embodiment, the content may include data of a specified size or more. For example, the content may include high-quality (e.g., high definition (HD), full high definition (full-HD), quad high definition (QHD), ultra high definition (UHD), or the like) image (or video image) data.

A wireless signal (or a radio frequency (RF) signal) in an embodiment of the disclosure may refer to a signal of a high frequency (e.g., 300 MHz or more) carrying and transmitting specified information. The wireless signal may be radiated into the air via an antenna by amplifying a high-frequency carrier to be delivered to a receiving device. In other words, because the wireless signal is transmitted through the air, it may be generated with a high frequency and a high voltage (or a high current).

According to an embodiment, the wireless signal receiving device 10 may be implemented as various devices, such as a TV, a desktop, a notebook PC, a smartphone, a tablet PC, a monitor, and a digital photo frame, which are capable of receiving and outputting content from an external device.

According to an embodiment, the wireless signal transmitting device 20 may transmit a wireless signal to the wireless signal receiving device 10. For example, the wireless signal transmitting device 20 may transmit the wireless signal to the wireless signal receiving device 10 via a relay tower 30. For another example, the wireless signal transmitting device 20 may transmit the wireless signal to the wireless signal receiving device 10 via a communication satellite 40.

The wireless signal receiving device 10 may deliver a transport stream (TS) signal corresponding to a signal including a high-quality image from the wireless signal transmitting device 20 to a signal processing unit. In this case, the wireless signal receiving device 10 may transmit the output TS signal according to a radio frequency (RF) signal of a high current (or voltage) in series to a specified line on a printed circuit board (PCB) using a spread spectrum used in a place for spreading a band of a low voltage differential signaling (LVDS) signal. Furthermore, the wireless signal receiving device 10 may use a short clock (CLK) of a specified period or less and may transmit a TS signal of a specified level or more. Thus, because electromagnetic waves occur due to a clock signal of a high frequency and noise of the signal of the specified level or more, electromagnetic interference (EMI) may occur between electronic devices. The wireless signal receiving device 10 according to various embodiments of the disclosure may spread a frequency spectrum (or a frequency band) of the received signal to minimize occurrence of an electromagnetic wave capable of interfering with another electronic device.

Figure 2:
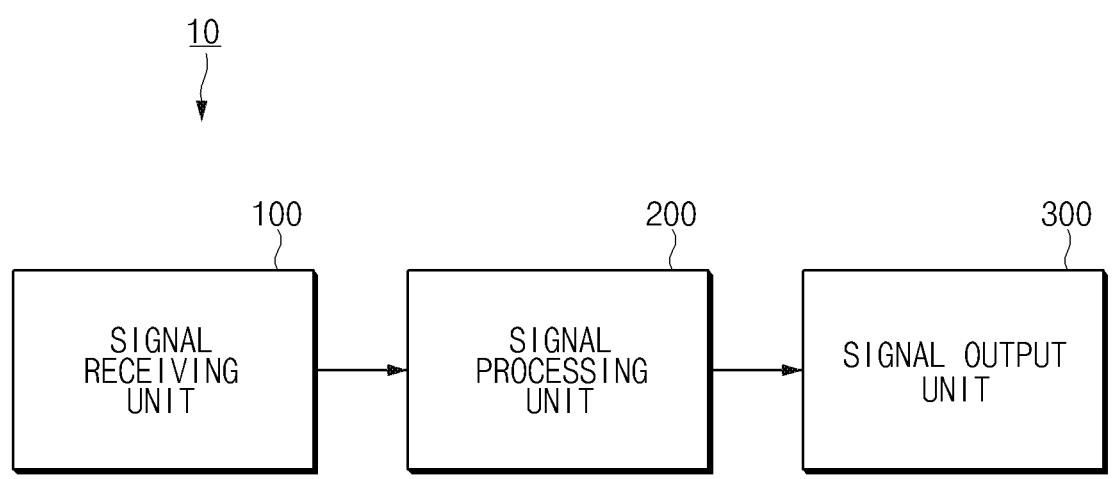
FIG. 2 is a block diagram illustrating a configuration of a wireless signal receiving device according to various embodiments of the disclosure.

FIG. 2 is a block diagram illustrating a configuration of a wireless signal receiving device according to various embodiments of the disclosure.

Referring to FIG. 2, a wireless signal receiving device 10 may include a signal receiving unit 100, a signal processing unit 200, and a signal output unit 300.

According to an embodiment, the signal receiving unit 100 may receive a signal from an external device. For example, the signal receiving unit 100 may receive a signal including a high-quality image. According to an embodiment, the signal receiving unit 100 may deliver the received signal to the signal processing unit 200. For example, the signal receiving unit 100 may output a TS signal corresponding to the received signal and may deliver the output TS signal to the signal processing unit 200. The TS signal may include, for example, a data signal associated with content, a clock signal including clock information, a synchronization signal including synchronization information, and a validity signal including validity information. Furthermore, the TS signal may be a signal of a high frequency and a high voltage (or a high current).

According to an embodiment, the signal receiving unit 100 may separately transmit signals included in the TS signal. For example, the signal receiving unit 100 may deliver the data signal, the clock signal, the synchronization signal, and the validity signal, which are included in the TS signal, through different lines. According to an embodiment, the signal receiving unit 100 may transmit the TS signal in series. For example, the signal receiving unit 100 may transmit the data signal included in the TS signal in series through one line.

According to an embodiment, the signal receiving unit 100 may spread a frequency spectrum (or a frequency band) of the TS signal transmitted in series. The data signal, the frequency spectrum of which is spread, may be transmitted, for example, in series.

According to an embodiment, the wireless signal processing unit 200 may process the received signal. For example, the signal processing unit 200 may process the signal included in the delivered TS signal to output content information. Information associated with the content may be output as content information using the clock information, the validity information, and the synchronization information, which are included in the TS signal.

According to an embodiment, the signal processing unit 200 may include a demultiplexer for dividing a variety of information included in the TS signal, a decoder for decoding the delivered TS signal to correspond to a format of the wireless signal receiving device 10, and a scaler for changing content to suit an output specification of the output unit 300. The TS signal may be, for example, a signal of a high frequency and a high voltage (or a high current). According to an embodiment, the signal processing unit 200 may deliver the processed signal to the signal output unit 300.

According to an embodiment, the signal output unit 300 may include at least one of a display and a speaker. According to an embodiment, the signal output unit 300 may output an image included in the processed signal on the display. For example, the signal output unit 300 may output a high-quality image on the display. According to an embodiment, the signal output unit 300 may output a sound included in the processed signal via the speaker.

Thus, the wireless signal receiving device 10 may spread a frequency spectrum of the TS signal corresponding to the received signal, thus minimizing occurrence of an electromagnetic wave by the TS signal.

Figure 3:
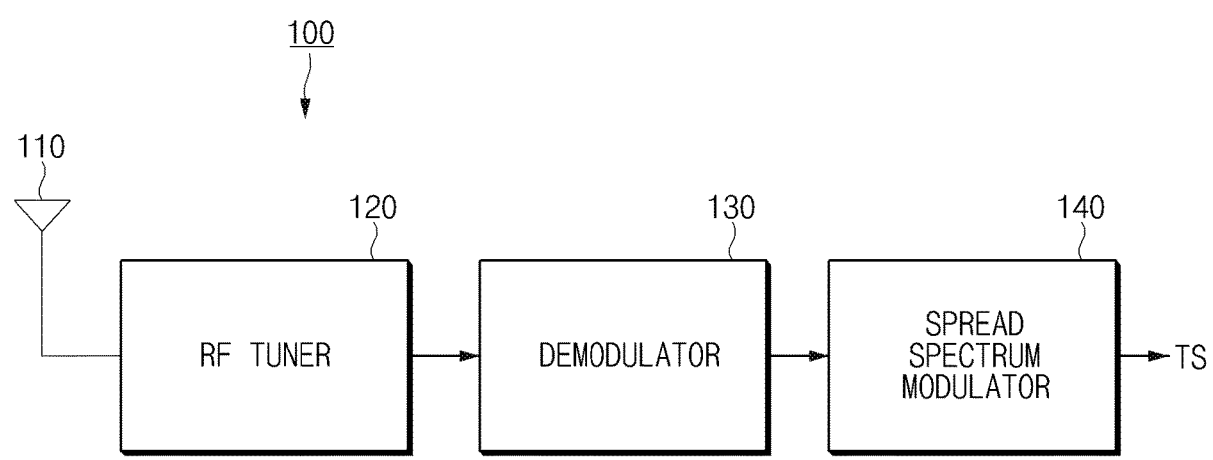
FIG. 3 is a block diagram illustrating a configuration of a signal receiving unit of a wireless signal receiving device according to various embodiments of the disclosure.

FIG. 3 is a block diagram illustrating a configuration of a signal receiving unit of a wireless signal receiving device according to various embodiments of the disclosure.

Referring to FIG. 3, a signal receiving unit 100 may include an antenna radiator 110, an RF tuner 120, a demodulator 130, and a spread spectrum modulator 140. According to an embodiment, to process a signal of a high current (or a high voltage) according to the received RF signal, the signal receiving unit 100 may include the spread spectrum modulator 140 mainly used to process an LVDS signal.

According to an embodiment, the antenna radiator 110 may form an electrical path for receiving a signal of a specified frequency band by a supplied current. For example, the antenna radiator 110 may form an electrical path by current supplied from the RF tuner 120.

According to an embodiment, the RF tuner 120 may receive a signal of a specified frequency band via the antenna radiator 110. For example, the RF tuner 120 may supply current to the antenna radiator 110 and may receive a signal of a frequency band corresponding to the electrical path formed on the antenna radiator 110 by the supplied current. According to an embodiment, the RF tuner 120 may deliver the received signal to the demodulator 130.

According to an embodiment, the demodulator 130 may demodulate the received signal. The received signal may be a signal modulated in, for example, a specified manner (e.g., quadrature phase shift keying (QPSK), quadrature amplitude modulation (QAM), orthogonal frequency division multiplexing (OFDM), vestigial side band modulation (VSB), or the like). According to an embodiment, the demodulator 130 may demodulate the received signal to output a TS signal of a specified frequency band (or a first frequency band). The TS signal may include, for example, a clock signal, a synchronization signal, a validity signal, and a data signal. Furthermore, the TS signal may be a signal of a high frequency and a high voltage (or a high current).

According to an embodiment, the spread spectrum modulator 140 may spread a frequency spectrum of the output TS signal. For example, the spread spectrum modulator 140 may expand a frequency band where information is included in the TS signal. According to an embodiment, the spread spectrum modulator 140 may spread a frequency spectrum of the TS signal to output a signal of a specified frequency band (or a second frequency band) (or a TS signal, a frequency spectrum of which is spread). According to an embodiment, the spread spectrum modulator 140 may deliver the TS signal, the frequency band of which is spread, to a signal processing unit (e.g., a signal processing unit 200 of FIG. 2).

Thus, the signal receiving unit 100 may spread the frequency spectrum of the TS signal for delivering the received signal to the signal processing unit 200, thus preventing occurrence of an electromagnetic wave capable of being generated in the delivery process.

Figure 4:
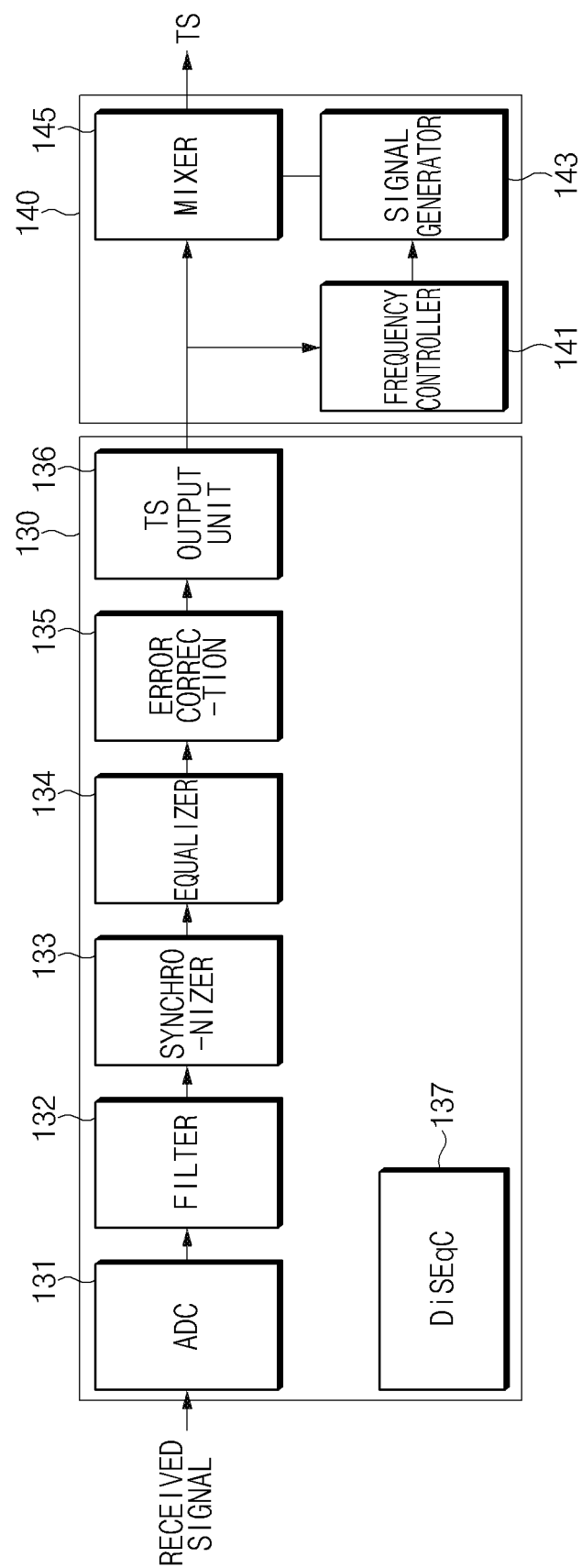
FIG. 4 is a block diagram illustrating configurations of a demodulator and a spread spectrum modulator according to an embodiment of the disclosure.

FIG. 4 is a block diagram illustrating configurations of a demodulator and a spread spectrum modulator according to an embodiment of the disclosure.

Referring to FIG. 4, a spread spectrum modulator 140 may spread a frequency spectrum of a TS signal output from a demodulator 130.

According to an embodiment, the demodulator 130 may include an AD converter 131, a filter 132, a synchronizer 133, an equalizer 134, an error correction unit 135, and a TS output unit 136 to demodulate a received signal. Furthermore, the demodulator 130 may further include a digital satellite equipment control (DiSEqC) 137 for receiving a wireless signal from a satellite.

According to an embodiment, the AD converter 131 may convert an analog signal into a digital signal. According to an embodiment, the AD converter 131 may deliver the converted digital signal to the filter 132. According to an embodiment, the AD converter 131 may be plural in number.

According to an embodiment, the filter 132 may filter a specified frequency band of the digital signal. For example, the filter 132 (e.g., a low pass filter (LPF)) may pass a frequency band of a specified frequency or less.

According to an embodiment, the synchronizer 133 may synchronizes the filtered signal. For example, the synchronizer 133 may execute timing recovery and carrier recovery to synchronize a signal received from a transmitting device (e.g., a wireless signal transmitting device 20) with a clock signal of a wireless signal receiving device 10.

According to an embodiment, the equalizer 134 may equalize the synchronized signal. For example, the equalizer 134 may perform fast Fourier transform (FFT) to equalize a distorted portion generated in the process of transmitting the signal.

According to an embodiment, the error correction unit 135 may correct an error of the equalized signal. For example, the error correction unit 135 may perform forward error correction (FEC) to correct an error of the signal.

According to an embodiment, the TS output unit 136 may output a TS signal including the error-corrected signal. The TS signal may include, for example, a data signal, a clock signal, a synchronization signal, and a validity signal. The data signal may include a data packet including information about content. The clock signal may include information about a clock for processing the data signal. The synchronization signal may include information about a head of the data packet for synchronization with the clock. The validity signal may include information about a section where the data packet is present. According to an embodiment, the TS output unit 136 may output a signal of a high frequency and a high voltage (or a high current). According to an embodiment, the TS output unit 136 may deliver the output TS signal to the spread spectrum modulator 140.

According to an embodiment, the spread spectrum modulator 140 may include a frequency controller 141, a signal generator 143, and a mixer 145 to spread a frequency spectrum of the TS signal.

According to an embodiment, the frequency controller 141 may control a frequency of a signal generated by the signal generator 143. For example, the frequency controller 141 may increase or decrease the frequency of the signal generated by the signal generator 143 to a specified level or a specified period. In other words, the frequency controller 141 may change the frequency of the signal generated by the signal generator 143 to the specified level at the specified period.

According to an embodiment, the frequency controller 141 may control the frequency of the signal generated by the signal generator 143 based on a frequency band (or a first frequency) of the TS signal output from the demodulator 130. The frequency controller 141 may receive information about a frequency band of the TS signal from the TS output unit 136 of the demodulator 130 and may determine a frequency of the signal generated by the signal generator 143 based on the received information. The frequency of the signal generated by the signal generator 143 may be determined on the basis of, for example, a specified frequency band (or a second frequency band) of a signal delivered to a signal processing unit. In other words, the frequency of the signal generated by the signal generator 143 may be determined as a frequency for changing the frequency band of the TS signal output from the demodulator 130 to a signal of the specified frequency band.

According to an embodiment, the signal generator 143 may output a signal of a specified frequency. The specified frequency may be, for example, a frequency determined by the frequency controller 141. According to an embodiment, the signal generator 143 may deliver the signal of the specified frequency to the mixer 145.

According to an embodiment, the mixer 145 may synthesize the TS signal output from the demodulator 130 and the signal output from the signal generator 143. For example, the mixer 145 may synthesize the TS signal output from the demodulator 130 and the signal output from the signal generator 143 to output a signal of the specified frequency band (or the second frequency band). The specified frequency band may be, for example, a frequency band where an electromagnetic wave of a specified level or less is generated, when the signal is generated. The specified level may be a level which does not affect an external electronic device due to occurrence of the electromagnetic wave. Thus, the mixer 145 may output a TS signal of the specified frequency band, the frequency spectrum of which is spread.

Figures 5A, 5B:
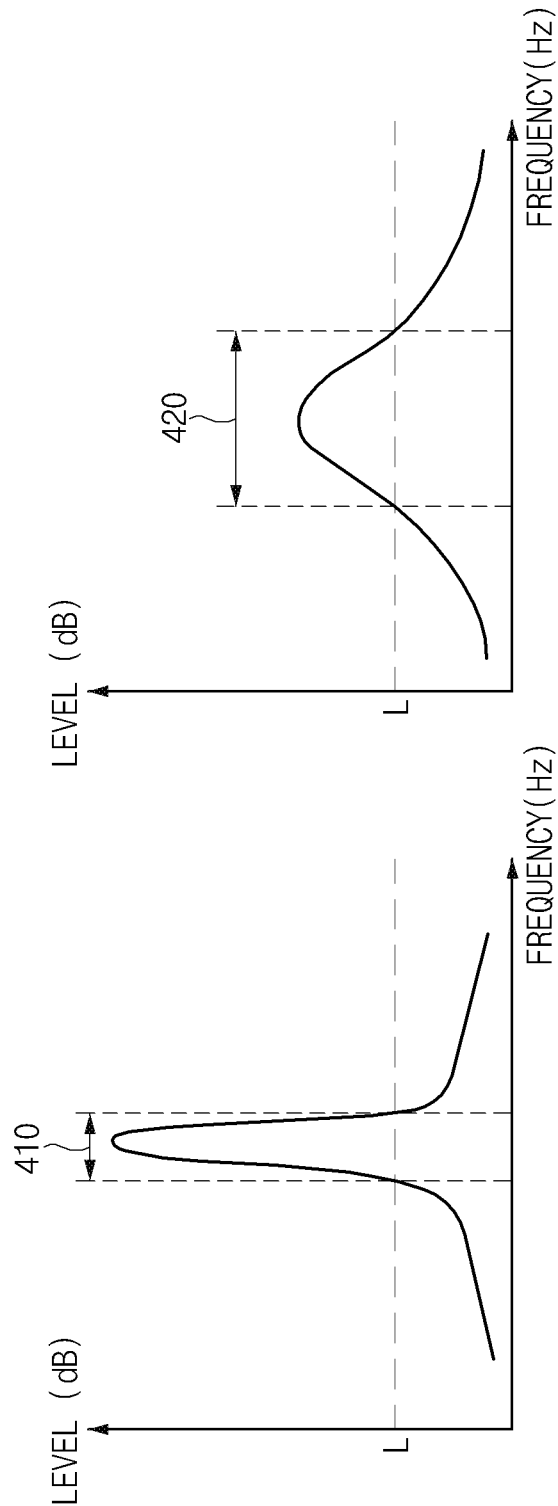
FIG. 5 is a graph illustrating a method for transmitting a received signal in a wireless signal receiving device according to various embodiments of the disclosure.

FIG. 5 is a graph illustrating a transport stream (TS) signal where a frequency band is spread by a wireless signal receiving device according to an embodiment.

Referring to FIG. 5, a wireless signal receiving device 10 may spread a frequency band of a TS signal via a spread spectrum modulator 140.

Referring to (a), the TS signal output from a demodulator 130 of the wireless signal receiving device 10 may include an energy of a specified level L or more in a first range 410. In the TS signal output via the demodulator 130, for example, the energy of the specified level or more may be intensively distributed in the first range 410. In other words, an average energy level included in the first range 410 may be high.

Referring to (b), the TS signal output from the spread spectrum modulator 140 of the wireless signal receiving device 10 may include the energy of the specified level L or more in a second range 420. In the TS signal output via the spread spectrum modulator 140, for example, the energy of the specified level or more may be distributed in the second range 420 wider than the first range 410 including the energy of the specified level or more in the input signal (or the TS signal output via the demodulator 130). In other words, an average energy level included in the second range 420 may be low.

Thus, the wireless signal receiving device 10 may prevent an electromagnetic wave from being generated by the TS signal delivered via the spread spectrum modulator 140.

According to various embodiments of the disclosure described with reference to FIGS. 1 to 5, when delivering a data signal included in a TS signal in series to process a signal including content such as a high-quality image, the wireless signal receiving device 10 may spread a frequency spectrum of the TS signal according to an RF signal of a high current using a spread spectrum used in a place for spreading a band of an LVDS signal, thus preventing an electromagnetic wave of a specified level or more capable of interfering with an operation of an external electronic device from being generated.

Figure 6:
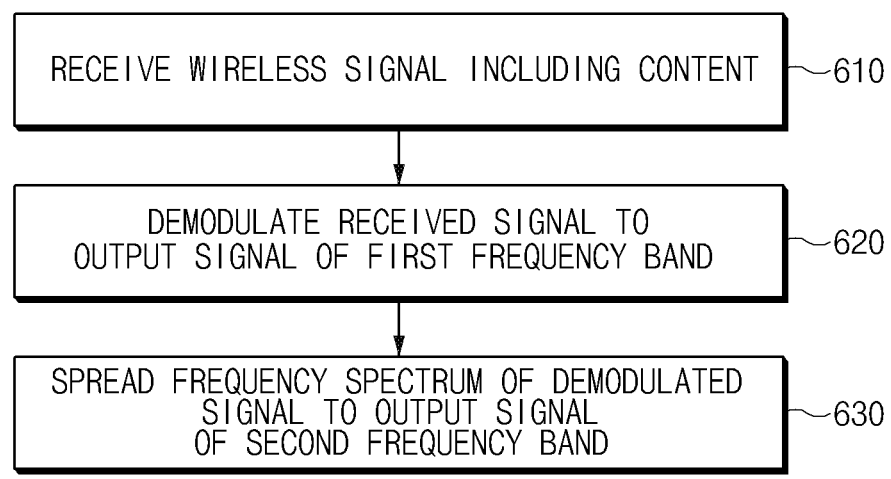
FIG. 6 is a flowchart illustrating a method for transmitting a received signal in a wireless signal receiving device according to various embodiments of the disclosure.

FIG. 6 is a flowchart illustrating a method for transmitting a received signal in a wireless signal receiving device according to various embodiments of the disclosure.

The flowchart shown in FIG. 6 may be configured with operations processed by the above-mentioned wireless signal receiving device 10. Thus, although there are contents omitted below, contents described about a wireless signal receiving device with reference to FIGS. 1 to 5 are applicable to the flowchart shown in FIG. 6.

According to an embodiment, in operation 610, an RF tuner 120 of the wireless signal receiving device 10 may receive a wireless signal via an antenna radiator 110 (see FIG. 3). The wireless signal may include, for example, data associated with content.

According to an embodiment, in operation 620, a demodulator 130 of the wireless signal receiving device 10 may demodulate the received signal to output a signal (e.g., a TS signal) of a first frequency band. According to an embodiment, an AD converter 131 of the wireless signal receiving device 10 may convert the received signal into a digital signal. According to an embodiment, a filter 132 of the wireless signal receiving device 10 may filter the converted digital signal. According to an embodiment, a synchronizer 133 of the wireless signal receiving device 10 may synchronizes the filtered signal. According to an embodiment, an equalizer 134 of the wireless signal receiving device 10 may adjust a level of a distorted frequency band of the synchronized signal. According to an embodiment, an error correction unit 135 of the wireless signal receiving device 10 may correct an error of the signal, the level of which is adjusted. According to an embodiment, a TS output unit 136 of the wireless signal receiving device 10 may output a TS signal of the first frequency band, the error of which is corrected (see FIG. 4).

According to an embodiment, in operation 630, a spread spectrum modulator 140 of the wireless signal receiving device 10 may spread a frequency spectrum of the demodulated signal to output a signal of a second frequency band. According to an embodiment, the wireless signal receiving device 10 may determine a frequency of a signal for spreading the frequency spectrum of the demodulated signal. For example, the wireless signal receiving device 10 may determine the frequency based on the first frequency band. According to an embodiment, the wireless signal receiving device 10 may output a signal of the specified frequency. According to an embodiment, the wireless signal receiving device 10 may convert the demodulated signal and the signal of the specified frequency.

Thus, the wireless signal receiving device 10 may deliver the signal, the frequency spectrum of which is spread, to a signal processing unit (e.g., a signal processing unit 200 of FIG. 2) in a serial manner.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. The computer-readable storage medium may include a hard disk, a floppy disk, a magnetic medium (e.g., a magnetic tape), an optical medium (e.g., a CD-ROM or a DVD), a magneto-optical medium (e.g., a floptical disk), an internal memory, or the like. The instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A wireless signal receiving device, comprising:
a radio frequency (RF) tuner configured to receive a wireless signal through an antenna radiator;
a demodulator configured to demodulate the wireless signal to output a transport stream (TS) signal of a first frequency band; and
a spread spectrum modulator comprising:
a frequency controller configured to determine a mixing signal frequency based on frequency information of the TS signal;
a signal generator configured to output a mixing signal having the determined mixing signal frequency; and
a mixer configured to mix the TS signal of the first frequency band with the mixing signal of the mixing signal frequency, to spread a frequency spectrum of the TS signal and output a demodulated signal of a second frequency band in which an intensity level of an electromagnetic wave is lower than an intensity level of an electromagnetic wave of the TS signal.

2. The wireless signal receiving device of claim 1, wherein the intensity level of the electromagnetic wave of the demodulated signal is a level which does not affect an external electronic device due to an occurrence of the electromagnetic wave.

3. The wireless signal receiving device of claim 1, wherein the demodulator includes:
an analog to digital (AD) converter configured to convert the received wireless signal into a digital signal;
at least one processor comprising:
a filter configured to filter the digital signal to obtain a filtered signal;
a synchronizer configured to synchronize the filtered signal to obtain a synchronized signal;
an equalizer configured to adjust a level of a distorted frequency band of the synchronized signal to obtain an adjusted signal; and
an error corrector configured to correct an error of the adjusted signal to obtain a corrected signal; and
an output interface configured to output the corrected signal as the TS signal of the first frequency band.

4. The wireless signal receiving device of claim 1, wherein the TS signal includes a data signal including a data packet including content information of the wireless signal, a clock signal including information about a clock for processing the data signal, a validity signal including information about a head of the data packet for processing the data signal according to the clock, and a synchronization signal including information about a section where the data packet is present in the data signal.

5. The wireless signal receiving device of claim 4, wherein the content information includes data of a specified size or more.

6. The wireless signal receiving device of claim 4, wherein the clock for processing the data signal is a signal of a specified period or less.

7. The wireless signal receiving device of claim 4, wherein the data signal is transmitted in series to one data line.

8. The wireless signal receiving device of claim 1, further comprising:
a processor configured to process the demodulated signal output from the spread spectrum modulator; and
an output interface configured to output content included in the processed signal.

9. The wireless signal receiving device of claim 8, wherein the output interface includes a display configured to display an image included in the wireless signal.

10. A method for processing a wireless signal by an electronic device, the method comprising:
receiving the wireless signal through an antenna radiator;
demodulating the wireless signal to output a transport stream (TS) signal of a first frequency band;
determining a mixing signal frequency based on frequency information of the TS signal;
obtaining a mixing signal having the determined mixing signal frequency; and
spreading a frequency spectrum of the TS signal to output a demodulated signal of a second frequency band in which an intensity level of an electromagnetic wave is lower than an intensity level of an electromagnetic wave of the TS signal, by mixing the TS signal of the first frequency band with the mixing signal of the mixing signal frequency.

* * * * *